July 17, 1956  H. A. PADDON  2,755,042
EJECTION SEAT CATAPULT

Filed Dec. 10, 1954  3 Sheets-Sheet 1

INVENTOR,
HENRY A. PADDON
BY
Martin E. Anderson
ATTORNEY

July 17, 1956  H. A. PADDON  2,755,042
EJECTION SEAT CATAPULT
Filed Dec. 10, 1954  3 Sheets-Sheet 2

INVENTOR.
HENRY A. PADDON
BY
ATTORNEY

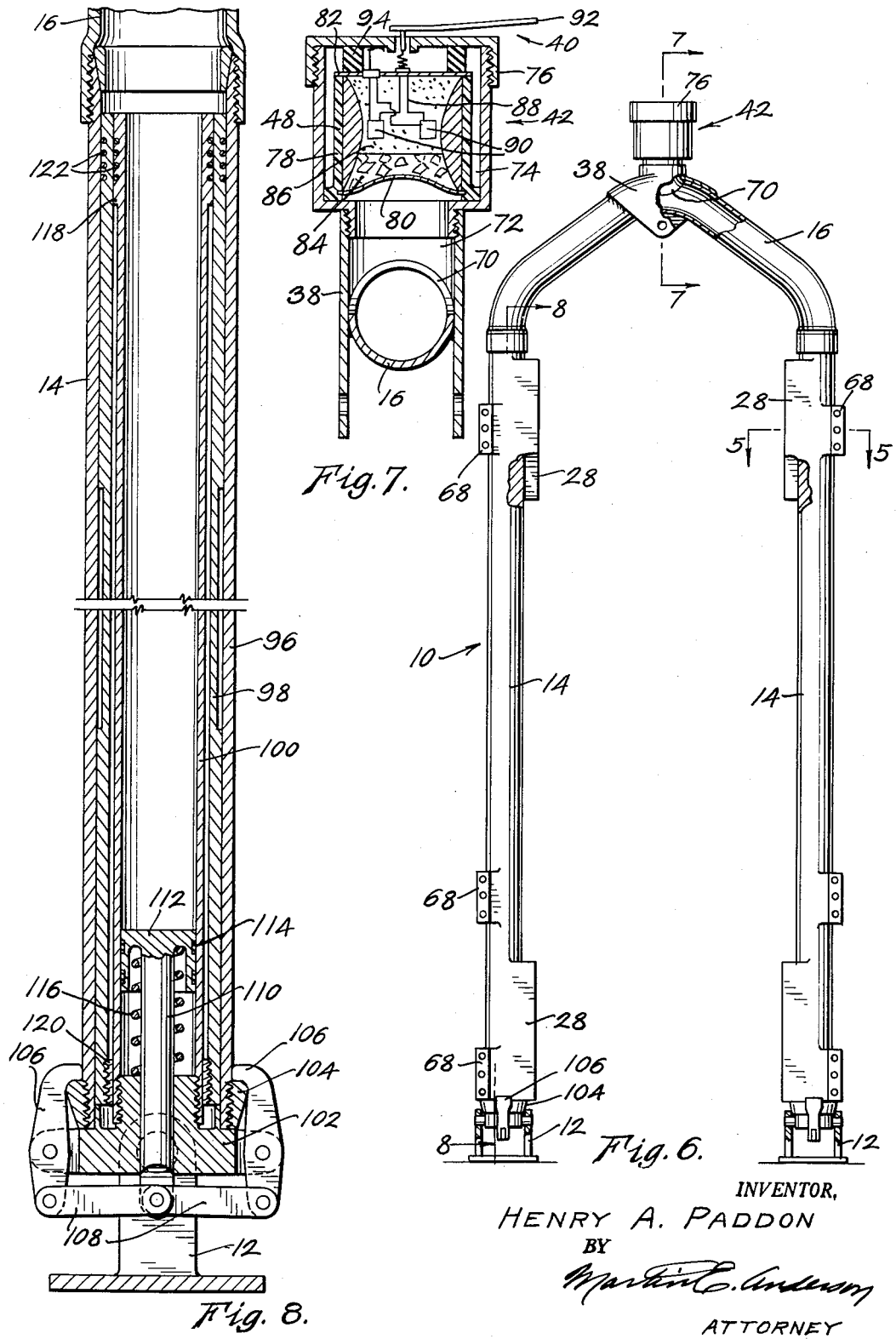

# United States Patent Office 2,755,042
Patented July 17, 1956

2,755,042

EJECTION SEAT CATAPULT

Henry A. Paddon, Colorado Springs, Colo.

Application December 10, 1954, Serial No. 474,522

8 Claims. (Cl. 244—122)

This invention relates to catapults, and more particularly, to ejection seat catapults. This application is a continuation in part of my copending application Ser. No. 438,248 filed June 21, 1954.

The speed at which modern jet aircraft fly creates several problems in connection with the safety of the pilot and other aircraft personnel which were not encountered in earlier day aircraft which flew at slower speeds. One such problem is the provision of means for getting the aircraft personnel out of the plane safely in case of emergency. In the past it was only necessary to open the canopy or hatch and jump from the plane. Now, however, the personnel would not be able to clear the tail surfaces if this procedure were used as the force of the slipstream at high speeds makes it virtually impossible to clear the plane. With the advent of high speed aircraft the ejection seat and ejection seat catapult became necessary so that the personnel could bail out of the plane without injury.

The conventional catapult consists in general of two or more telescoping tubes connected to the ejection seat and containing a ballistics charge. The ejection seat is mounted in guide rails which direct the seat out through an opening in the fuselage of the plane. The pilot is, of course, securely held in the seat by his safety harness, and he leaves the plane along with the seat.

These catapults are made up of straight tubes telescoped one within the other and positioned vertically at the back of the ejection seat along the center line. In the case of pilots' seats a vertical adjustment motor or actuator is connected between the upper end of the catapult and the top of the seat for adjusting the position of the seat relative to the floor for the comfort of the pilot. The actuator is usually connected to the ejection seat at two points spaced equidistant on each side of the center line of the seat to prevent it from tilting in the ejection guide rails as the seat is catapulted from the plane. The yoke used with this type of actuator and catapult is considerably heavier than the yoke used with a single screw actuator of the type employed with the catapult of the present invention. The designers of today's aircraft make every effort to eliminate even a few pounds of excess weight in the plane in order to improve its performance characteristics.

A second factor of equal importance to that of eliminating excess weight is the conservation of space. Fighter planes, in particular, require a great deal of instrumentation and equipment within easy reach of the pilot who must perform all functions connected with flying the plane, navigating it and engaging in combat. As a result, the cockpit is crowded with equipment and every available inch must be used most effectively. The conventional catapult construction causes much valuable space to be wasted in that the ejection seat must be moved forward from the bulkhead to accommodate it. Also, the space alongside the catapult behind the ejection seat is substantially useless because any equipment placed in this position would likely interfere with operation of the ejection mechanism.

A third factor of extreme importance is the provision of means for guiding the seat continually to a point at which it is sure the pilot will clear the plane safely. Any catapult which does not use ejection guide rails and lets the seat move unguided out of the cockpit even through part of its movement is extremely dangerous and undesirable. Sliding members connected to the catapult and moving within ejection guide rails which extend substantially the full height of the cockpit are the safest, most reliable and effective means for accomplishing this guided movement. The use of the telescoping tubes of the catapult alone to guide the seat out of the cockpit is extremely dangerous in that the tubes will become jammed if the seat tilts and as the tubes become extended they furnish very little guided movement to the seat. Also, if the telescoping tubes are to function as guide rails for the ejection seat as well as a catapult they must be of a heavy construction thus increasing the weight of the catapult at the expense of eliminating the separate ejection guide rails.

It is the principal object of the present invention to provide an ejection seat catapult which will result in a considerable saving in both weight and space in modern aircraft. The catapult is constructed to permit the ejection seat to be positioned quite close to the bulkhead. Also, if desired, the area behind the seat is left clear for other equipment. A saving in weight is effected because the catapult itself supports the ejection seat on each side thus eliminating the need for a double-screw actuator having a heavy yoke and permitting a single screw actuator to be used in its place which is considerably lighter.

The second object of the invention is to provide a catapult adaptable to firing by a single centrally located powder charge.

Further objects are to provide an ejection seat catapult which is simple, lightweight, and easily constructed; one which is readily adaptable to use with many types of aircraft ejection seats; and a catapult which results in less shock to the pilot upon ejection than conventional catapults.

Other objects will be in part apparent and in part pointed out specifically hereinafter in connection with the description of the drawing which follows, and in which:

Figure 6 is a rear elevation of a slightly modified form of the catapult of the present invention having a different slide block and trunnion arrangement as well as a modified propulsion and firing mechanism;

Figure 3:
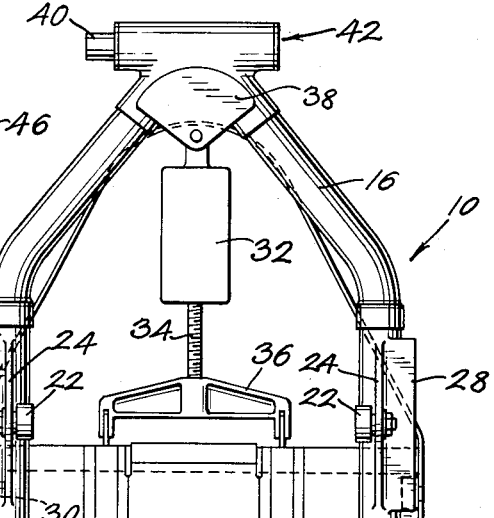
Figure 3 is a rear elevation looking in the direction of arrow 3 of Figure 1, the ejection guide rails having been deleted to better show the construction.
Figure 3:
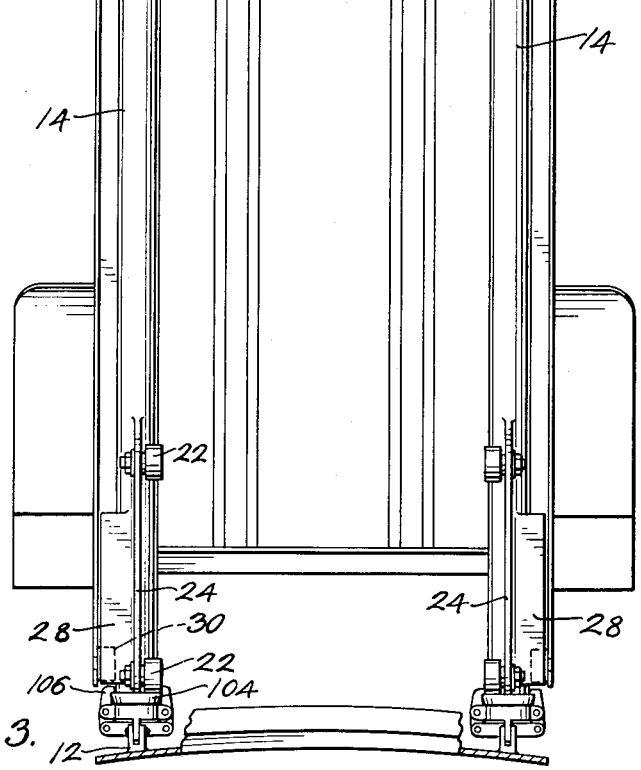

Figure 7 is a diametrical section taken along line 7—7 of Figure 6 showing the modified propulsion and firing mechanism; and, Figure 8 is a diametrical section taken along line 8—8 of Figure 6 showing the arrangement of the telescoping tubes in each of the parallel leg portions of the modifications illustrated in Figures 3 and 6.

Figure 1:
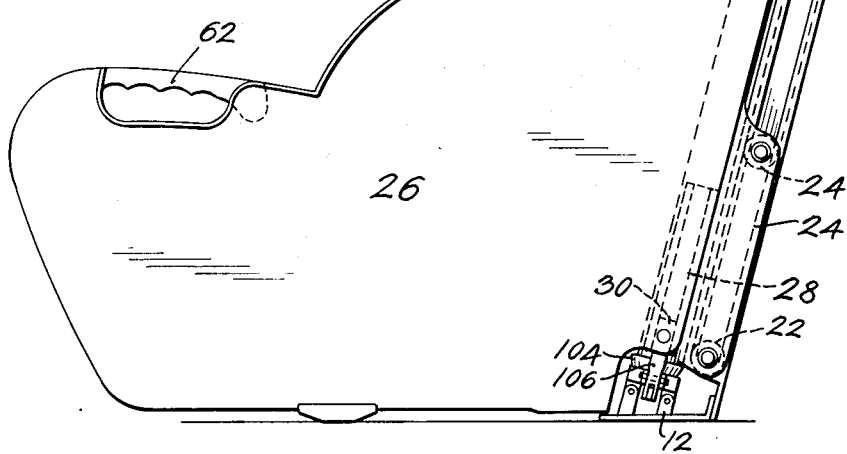
Figure 1 is a side elevation showing the ejection seat connected to the catapult of the present invention and the catapult in turn mounted for slidable movement in the ejection guide rails.

Referring now in particular to Figures 1 and 3 of the drawing, reference numeral 10 indicates the catapult of the present invention in a general way and is shown with its free ends secured to the floor of the plane within brackets 12. The catapult consists of two spaced parallel hollow leg portions 14 connected together by transverse hollow leg portion 16. Channel-shaped ejection guide rails 18 are rigidly secured to the bulkhead 20 of the plane. The channels of the ejection guide rails are positioned to receive trunnions 22 for movement therein. The trunnions are rigidly attached to webs 24 on the outer tube of each parallel hollow leg portion. Two trunnions are preferably spaced at the lower end of the hollow leg portions in order that the ejection seat 26 will have the maximum possible guided movement out of the plane without being able to tip forward or backward. After the upper pair of trunnions leave the top of the ejection guide rails which extend nearly to the top of the fuselage the lower spaced trunnions will prevent the ejection seat from tipping forward in the ejection guide rails.

Figure 2:
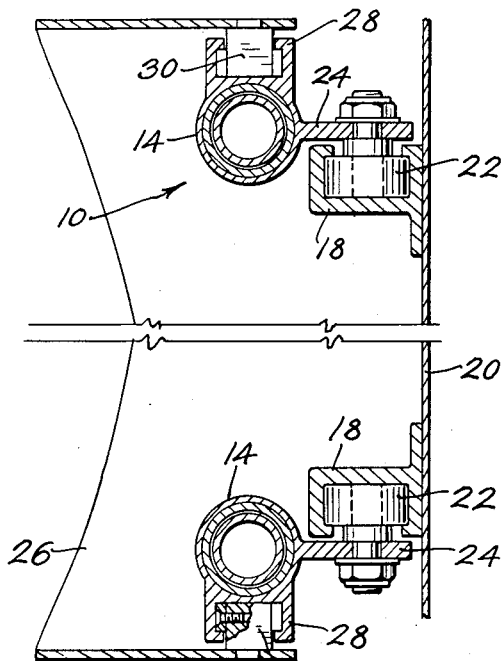
Figure 2 is a transverse section taken along line 2—2 of Figure 1.

Each of the parallel hollow leg portions is shown provided with seat adjustment guide rails 28. In the modification of Figures 1 through 4 the seat adjustment guide rails open away from one another on opposite sides of the parallel leg portions. Slide blocks 30, as shown most clearly in Figure 2, are rigidly attached to the sides of the ejection seat facing inwardly for slidable movement within the seat adjustment guide rails. An actuator 32, shown only in Figure 3, operatively interconnects the ejection seat and the transverse hollow leg portion of the catapult. The actuator is a reversible electric motor which rotates an actuator screw 34 which is thereby threaded in and out of the yoke 36 secured to the ejection seat and causes the seat to be raised and lowered relative to the floor for the comfort of the pilot. The slide blocks move upward and downward within the seat adjustment guide rails as the seat is adjusted. A saddle 38 is attached to the transverse hollow leg portion at a point spaced midway between the parallel leg portions and the upper end of the actuator is removably attached thereto. Vertical adjustment of the ejection seat with respect to the floor is seldom provided for aircraft personnel other than the pilot; and therefore, the mechanism for adjusting the seat may be eliminated in many instances.

Figure 2 shows the seat adjustment and ejection mechanism in greater detail to a larger scale. The channel-shaped ejection guide rails 18 are rigidly connected to the bulkhead 20 in spaced parallel position behind the ejection seat. In the modification shown, the channels in the ejection guide rails face outward in opposite directions. The webs 24 extend rearwardly from the outer tube of the parallel hollow leg portions and lap the ejection guide rails. Trunnions 22 extend inwardly from the webs into the channel of the ejection guide rails so that they may move upward therein as the ejection seat is propelled out of the plane. The seat adjustment guide rails 28 which are also channel-shaped open outwardly from opposite sides of the outer tube of the parallel hollow leg portions. The slide blocks 30 are rigidly attached in position on the seat to extend into the seat adjustment guide rails and are mounted for slidable movement therein. The space behind the ejection seat between the parallel leg portions of the catapult is left clear for other equipment such as inertia reels and the like which are customarily mounted in this space. Even though the space behind the seat is filled with equipment it will not interfere with the proper ejection of the seat.

Figure 4:
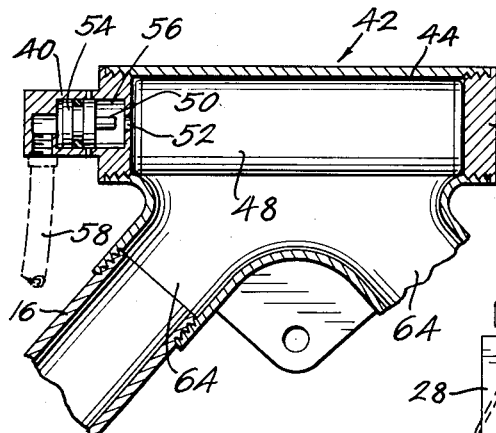
Figure 4 is a section taken along line 4—4 of Figure 1 showing the propulsion and firing mechanisms.

Figure 4 illustrates the firing mechanism 40 and the propulsion mechanism 42. Propulsion mechanism 42 consists of a substantially horizontal chamber 44 with one end closed by a removable plug 46 and the other end by the firing mechanism 40. A cartridge 48 is placed in the chamber in position to be fired by the firing pin 50 as it moves through firing pin opening 52 of the firing mechanism. The firing pin is positioned on the inner end of bolt 54 which moves through the breech 56 by the pressure of the gas introduced behind the bolt through gas entry tube 58. An annular gasket 60 surrounds the bolt and seals the gas from the inner end of the breech. The cartridge 48 is generally provided with a suitable cap, booster charge and propellant charge which have not been shown in detail. Removal of plug 46 or the firing mechanism from the propulsion mechanism enables the cartridge to be taken out of the chamber thereby disarming the catapult so that it can be serviced without danger to personnel. Gas pressure can be introduced behind the bolt either ballistically or by compressed air upon actuation of trigger mechanism 62 on the arm of the ejection seat. Chamber 44 communicates with the two sections of the transverse hollow leg portions 16 through branches 64 of the propulsion mechanism. Thus, detonation of the cartridge will build up an equal pressure simultaneously in each of the parallel leg portions by means of the interconnecting transverse hollow leg portion. With an equal pressure in each of the hollow leg portions there will be no tendency for the catapult to tip or become skewed in the ejection guide rails thereby endangering the life of the pilot.

Figure 6 illustrates a modified form of the catapult differing from the modification of Figures 1 through 4 in the propulsion mechanism, firing mechanism and the specific arrangement of the seat adjustment and ejection mechanisms. First, it will be seen that the seat adjustment guide rails 28 open toward one another on the inside of the parallel leg portions rather than the outside. Trunnions 66, shown in Figure 5, replace the slide blocks 30 of the aforementioned construction for accomplishing the seat adjustment. The trunnions 66 move upward and downward within the seat adjustment guide rails 28 as will be clearly seen in connection with Figure 5. These trunnions are rigidly connected to the seat. Slide blocks 68 replace trunnions 22 of the earlier modification and are mounted on the outside of the outer tube of the parallel leg portions substantially opposite the seat adjustment guide rails. The ejection seat guide rails 18 are rigidly connected to the bulkhead 20 in spaced substantially parallel relation with the channels therein facing inwardly to receive the slide blocks 68 for slidable movement. This construction enables the seat to be mounted closer to the bulkhead than the earlier modification which is useful where no equipment is to be placed behind the seat.

In this modification the transverse hollow leg portion is one continuous tube interconnecting at each end with the parallel leg portions. The transverse leg portion is provided with an opening 70 intermediate its ends in the top of the tube through which the propulsive force of the exploding cartridge 48 enters the parallel leg portions through the transverse leg portions. The saddle 38 is fastened to the transverse hollow leg portion and contains an opening 72 registering with the opening 70 in the transverse leg. The propulsion mechanism 42 is threaded into the top of the saddle and the chamber 74 communicates the parallel leg portions through the transverse leg portion. The top 76 of the propulsion mechanism is threaded thereon for easy removal in order to disarm the catapult. The cartridge 48 preferably consists of a cylindrical plastic wall 78 closed at each end by a bottom wall 80 and a top wall 82. The cartridge contains the propellant charge 84 and a booster charge 86. A suitable electrical firing circuit 88 interconnects caps 90 with a source of electrical energy 92 which is connected into the cartridge through the top of the propulsion mechanism. A rubber ring 94 keeps the cartridge from jiggling in the propulsion mechanism which would perhaps cause it to detonate prematurely.

Figure 5:
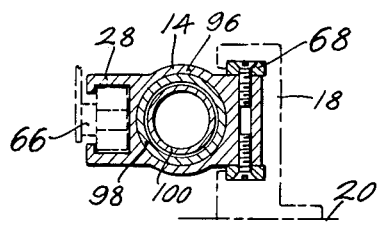
Figure 5 is a transverse section taken along line 5—5 of Figure 6.

Referring now in particular to Figure 8 of the drawing wherein is shown the telescoping tube construction of the parallel hollow leg portions 14 which is used in both the modification of Figures 1 to 4 and the modification of Figures 5 through 7. Each of the parallel leg portions consists of an outer tube 96 which is threadedly connected at its upper end to the free ends of the transverse hollow leg portion. The lower end of inner tube 100 is attached to a connector element 102 which is in turn attached to bracket 12 and the floor. An intermediate tube 98 is concentrically mounted for relative axial sliding movement within the outer tube and outside the inner tube. Outer tube 96 is provided with a ring 104 threaded on its lower end. Pivot members 106 are mounted for pivotal movement on the outer ends of connector element 102 in position to hook over ring 104 and prevent tube 96 from moving upward. Links 108 interconnect the lower ends of the pivot members and the lower end of piston rod 110 which is mounted for slidable movement within the axial opening in connector element 102. A piston 112 is fastened to the upper end of the piston rod for slidable movement within the inner tube 100. Gaskets 114 seal the piston within inner tube 100. Compression spring 116 acts between the piston and the connector element to force the piston up inside the inner tube. The expanding gas pressure caused by detonation of the cartridge acts on piston 112 to force it downward against the action of compression spring 116 which in turn moves the piston rod 110 downward through the connector element and causes links 108 to pull the lower end of the pivot members inward thereby releasing the hooks from ring 104 so that the outer tube 96 may move upward relative to the inner tube 100. As outer tube 96 is released and moves upward over inner tube 100 due to the pressure created by the expanding gas within the catapult it carries intermediate tube 98 along by means of frictional contact between the outer surface of the intermediate tube and the inner surface of the outer tube. Intermediate tube 98 is provided with an inside stop 120 at its lower end which moves upward with the tube and engages outside annular seal 118 on the upper end of the inner tube 100. As stop 120 engages annular seal 118 further upward movement of the intermediate tube is prevented and outer tube 96 moves on upward off the intermediate and inner tubes carrying with it the ejection seat and pilot. O-rings 122 provide a gas seal for adjacent surfaces of the three telescoping tubes.

From the foregoing description of the ejection seat catapult of the present invention in connection with the accompanying drawing it will be seen that the many useful objects for which it was designed have been achieved; and therefore, I claim:

1. A device for ejecting aircraft seats from aircraft comprising in combination: a catapult, said catapult comprising two spaced parallel leg portions each of which has an inner, intermediate and outer tubular element concentrically mounted for relative axial sliding movement, each of said inner tubular elements having a rigid annular seal at its upper end forming a gas-tight seal with the inside surface of the corresponding intermediate tubular element, each of said intermediate tubular elements having a rigid stop at its lower end positioned to engage the annular seal on the upper end of the corresponding inner tubular element and stop said intermediate and inner tubular elements in extended position, each of said intermediate tubular elements having an annular seal at its upper end forming a gas-tight seal with the inside surface of the corresponding outer tubular element and forming means for holding said tubular elements together for conjoint axial movement relative to the corresponding inner tubular element until the extended position is reached where further relative movement between the inner and intermediate tubular elements is prevented by the stop engaging the annular seal whereupon the outer tubular element may overcome the frictional force holding it to the intermediate tubular element and begin to slide axially relative to said intermediate tubular element until it becomes disengaged therefrom, a connector element attached to the lower end of each inner tubular element closing said end and attaching said inner tubular element to the fuselage of an aircraft, a transverse hollow leg portion connected between the upper ends of the outer tubular elements to form a closed inverted U-shaped gas expansion chamber with the tubular elements of said parallel leg portions, a propulsion mechanism connected into the gas expansion chamber at approximately the mid-point of the transverse hollow leg portion, said propulsion mechanism having a cartridge positioned therein providing means for creating a gas pressure in the gas expansion chamber which will cause the tubular elements of the parallel leg portions to slide axially relative to one another, and a firing mechanism operatively connected to the propulsion mechanism for detonating the cartridge; an aircraft ejection seat connected to the U-shaped tube formed by the transverse leg portion and the outer tubular elements of the parallel leg portions; and means for guiding the aircraft seat and U-shaped tube of the catapult out of the aircraft upon detonation of the cartridge comprising ejection guide rails fastened to the fuselage and sliding members interconnecting the outer tubular elements of the parallel leg portions with said ejection guide rails.

2. A device in accordance with claim 1 in which: the ejection guide rails are rigidly attached to the aircraft parallel to the parallel legs of the catapult; and at least one sliding member is attached to the upper and lower ends of each outer tubular element in position to move within the ejection guide rails.

3. A device in accordance with claim 2 in which: two sliding members are attached to the lower end of each outer tubular element in spaced relation.

4. A device in accordance with claim 2 in which: the aircraft seat is connected to the catapult by means for effecting relative adjustment therebetween; said means comprising, seat adjusting guide rails and sliding members positioned to slide within said adjustment rails, and an actuator operatively connected between the seat and the transverse leg portion of the catapult for moving said seat within the adjustment rails.

5. A device in accordance with claim 4 in which: the seat adjustment rails are rigidly connected to the outer tubular elements of the catapult and the sliding members are rigidly connected to the aircraft seat in position to slide within the adjustment rails.

6. A device for ejecting aircraft seats from aircraft comprising in combination: a catapult, said catapult comprising spaced parallel hollow leg portions, each of said parallel leg portions having at least two tubular elements mounted for telescoping movement, one of said tubular elements being stationary and the remaining tubular elements being movable, a transverse hollow leg portion interconnecting one movable tubular element of each parallel leg portion, said leg portions combining to form a single closed gas chamber, means comprising a propulsion mechanism connected into said gas chamber for creating a gas pressure therein, and means comprising a firing mechanism operatively connected to the propulsion mechanism for actuating the same; an aircraft seat connected to a movable portion of the catapult by means for effecting relative adjustment therebetween, said means comprising seat adjustment guide rails and sliding members positioned to slide within said adjustment rails, one of said adjustment elements being rigidly attached to the aircraft seat and the other to the parallel leg portions of the catapult, and an actuator operatively connected between the transverse hollow leg portions of the catapult and the seat for moving said seat within the adjustment rails; and guide means interconnecting the catapult and aircraft fuselage for guiding the aircraft seat and movable portion of the catapult out of the aircraft upon firing of the propulsion mechanism comprising, ejection guide rails and sliding member movable within said guide rails, one of said guiding elements being rigidly attached to the aircraft fuselage and the other to a movable tubular element of each parallel leg portion.

7. A device in accordance with claim 6 in which the seat adjustment rails are rigidly connected to the parallel legs of the catapult and the sliding members are rigidly connected to the aircraft seat in position to slide within the adjustment rails.

8. A device in accordance with claim 7 in which the actuator is connected between the transverse leg and the catapult in line with the center of gravity.

References Cited in the file of this patent
UNITED STATES PATENTS

| | | |
|---|---|---|
| 2,459,948 | Lobelle | Jan. 25, 1949 |
| 2,541,087 | Musser | Feb. 13, 1951 |
| 2,702,677 | Replogle | Feb. 22, 1955 |